Aug. 11, 1953
C. D. DYER
2,648,489
BOOSTER FOR AIR BRAKE SYSTEMS
Filed Aug. 3, 1951
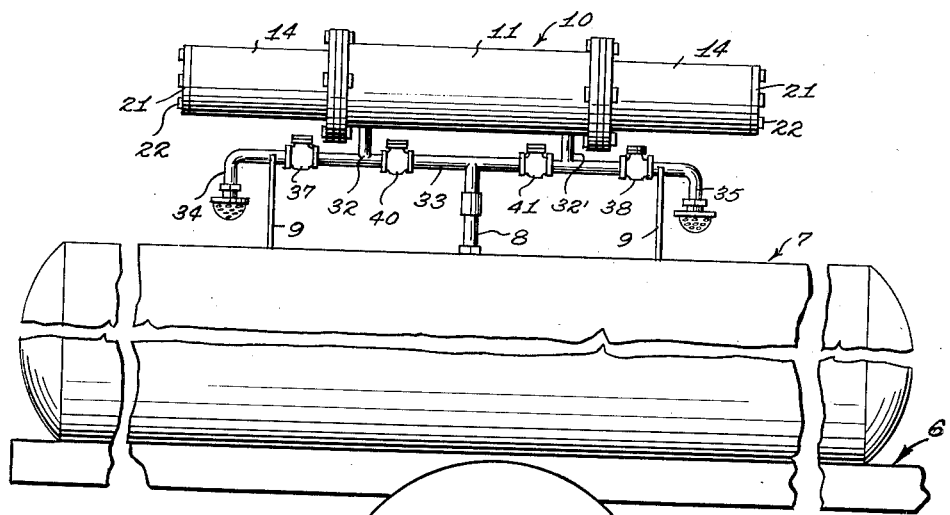
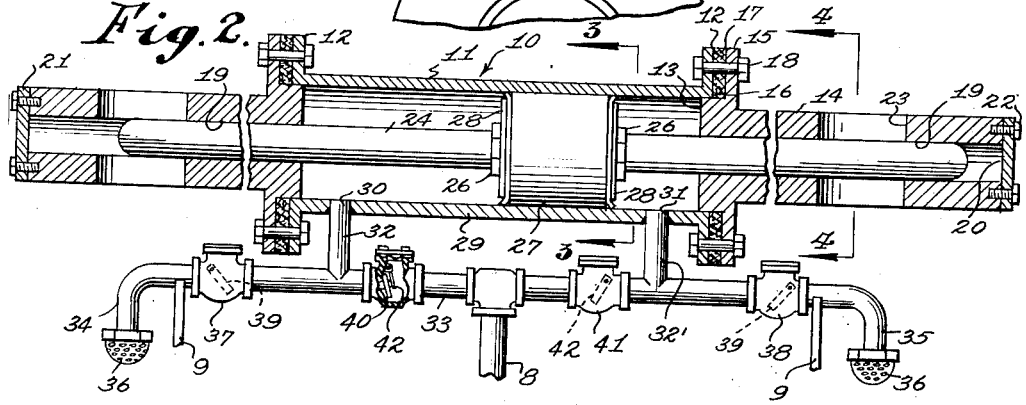
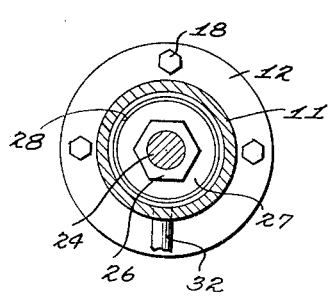
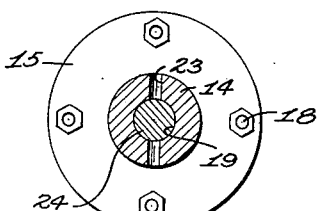
INVENTOR
*Charles D. Dyer*
BY
*McMorrow, Berman + Davidson*
ATTORNEYS Patented Aug. 11, 1953

2,648,489

UNITED STATES PATENT OFFICE 2,648,489

BOOSTER FOR AIR BRAKE SYSTEMS

Charles D. Dyer, Chicopee, Mass.

Application August 3, 1951, Serial No. 240,248

3 Claims. (Cl. 230—34)

This invention relates to an inertia-operated booster device for compressed air-operated vehicle brake systems and the like, involving a compressor, an automatic pressure regulator for cutting the compressor on and off, and a compressed air storage tank, the primary object of the invention being to provide an inertia-operated booster device adapted to be connected with the storage tank and serving to prevent or reduce loss of pressure from the tank when the brakes are operated during an off cycle of the compressor and serving to restore with outside air any air lost from the tank under such condition, the action of the device being dependent upon changes in position of a piston within a cylinder produced by acceleration and deceleration of such a vehicle and modified by changes in pressure within the tank which attend applications of and release of the brakes or other compressed air utilization means in both the off and on cycles of the compressor, wherein the pressure within the tank may fall below and rise above the operating setting of the regulator.

Another important object of the invention is the provision of a device of the character indicated above in which a heavy, freely movable inertia piston is employed whose movements in the cylinder are varied as to speed and amplitude by the resistance to movement inherent in the inertia of the piston itself, by the momentum of the piston gained in movement thereof and by the speed, frequency and amount of accelerations and decelerations and of the variations in air pressure within the tank as produced by varying applications of and releasings of the brakes and the accompanying responses of the regulator and compressor thereto, an over-all desirable effect of the device being to level off the peaks and valleys in the tank pressure which occur under the conditions mentioned as a result of lag in the controlled operation of the compressor in response to pressure changes in the system by the regulator as varying demands are imposed upon the system.

Another important object of the invention is to provide a highly simplified and effective device of the character indicated above and one which includes dash-pot means for preventing hammering of the piston at opposite ends of its strokes.

Other important objects and advantageous features of the invention will be apparent from the following description and the accompanying drawings, wherein, for purposes of illustration only, a specific embodiment of the invention is set forth in detail.

In the drawings:

Figure 1 is a contracted side elevation;

Figure 2 is an enlarged fragmentary vertical longitudinal section taken through the device; and Figures 3 and 4 are transverse vertical sections taken on the lines 3—3 and 4—4 of Figure 2.

Referring in detail to the drawings, wherein like numerals designate like parts throughout the several views, the numeral 7 generally designates the compressed air storage tank of such as a vehicle compressed air brake system (not shown), the tank 7 being supported on a vehicle frame 6. The tank 7 has a single compressed air intake pipe 8, preferably entering the tank at a point midway its ends. Supported in suitable manner in the region of the tank 7, as by brackets 9 rising from the top of the tank at opposite sides of the vertical intake pipe 8, is the illustrated booster device, generally designated 10.

The booster device 10 comprises a preferably horizontally elongated, uniform-diameter cylinder 11 having lateral flanges 12 on its opposite ends. The ends of the cylinder receive therein enlarged-diameter terminals 13 on the axially inward ends of axial sleeve bearings 14, the terminals 13 having lateral flanges 15 spaced from and facing the flanges 12, whereby annular channels 16 are formed which are packed with annular packings 17, the bearings being assembled to the cylinder and the packings being placed under sealing pressure by means of bolts 18 traversing the opposed flanges and the related packings.

The sleeve bearings 14 have axial bores 19 which open through the axially outward ends of the bearings, as indicated at 20, the outer ends of the bores being closed by closure plates 21 secured removably in place by means of studs 22 traversing the plates and threaded into the bearing ends. Near to, but spaced from, the axial outward ends of the bearings 14, these bearings are formed with relatively long, radial, longitudinal slots 23 which open through opposite sides of the bearings and provide relatively unrestricted communication between the bearing bores 19 and the outside atmosphere.

A smooth piston rod 24, shorter than the distance between the closure plates 21, but preferably longer than the distance between the ports 23, is slidably positioned in the sleeve bearing bores 19 and extends through the bore 25 of the cylinder 11 in relatively greatly concentrically spaced relation thereto. Fixed at the middle of the piston rod 24 by nuts 26 threaded thereon against its oppoiste ends is the piston 27, which includes flexible pressure sealing cups 28 on its opposite ends. The piston 27 has preferably a length greater than its diameter and is preferably made of lead or like heavy material, so as to be very heavy and possess very substantial resistance to movement due to its inherent inertia, and to possess substantial momentum as a result of being moved in the cylinder 11 in either direction.

A part of the side wall 29 of the cylinder 11, such as the under part thereof, is formed with two ports 30 and 31, respectively, which are located near to, but spaced from, the ends of the cylinder. These ports have connected thereto one end of branch pipes 32 and 32', respectively, whose opposite ends are connected to a main pipe 33 paralleling the cylinder 11, the main pipe 33 being connected preferably at its mid-point to the tank intake pipe 8.

The main pipe 33 terminates at its opposite ends in laterally or downwardly directed open terminals 34 and 35, which have intake communication with the outside air and are protectively covered by screens 36.

Located in the main pipe 33 between the left-hand air intake 34 and the left-hand branch pipe 32, and between the right-hand air intake 35 and the right-hand branch pipe 32', are check valves 37 and 38, respectively. These valves involve preferably hinged flaps 39, are normally closed, and are operated to open position only by intake suction exerted through the main pipe 33.

Located in the main pipe 33 between the left-hand branch pipe 32 and the tank intake pipe 8, and between the right-hand branch pipe 32' and the tank intake pipe 8, are compressed air discharge check valves 40 and 41, respectively. These valves are normally closed and involve preferably hinged flaps 42 which are operated to open position only by pressure at the axially outward sides of the valves 40 and 41.

The piston 27 is prevented from traveling in either direction in the cylinder 11 beyond the approach sides of the ports 30 and 31. This is accomplished by predetermining the length of the piston rod 24 and providing the piston rod with hemispherical ends 43 which are arranged to enter the dash-pots defined by the ends of the bearing bores 19 and the closure plates 21, after passing along the slots 23, so that outside air is compressed in the dash-pots sufficiently to slow down and stop the travel of the piston at the desired point while precluding a hammering effect which might otherwise occur, especially when operating conditions of the brake system or the like are such as to produce frequent and forceful reciprocations of the piston.

In operation, suppose that the piston 27 has been operated to the right-hand position shown in Figure 2, such movement from a leftwards position produced opening of the right-hand pressure discharge valve 41 so that the pressure in the right-hand end of the cylinder 11 ahead of the piston was transmitted through the port 31, branch pipe 32', the main pipe 33, and tank intake pipe 8 into the tank 7. At the same time, left-hand air intake valve 37 was opened by suction in the left-hand end of the cylinder 11 produced behind the piston 27 so that outside air was drawn through the left-hand screened intake terminal 34, through the main pipe 33, the left-hand branch pipe 32, and the left-hand port 30, into the cylinder 11 behind the piston 27 in a relatively uncompressed condition. In this way the air pressure in the tank 7 was increased and outside air placed in the cylinder for compression therein and transmission to the tank 7 on the next leftwards movement of the piston 27.

Suppose that the right-hand end of the cylinder 11 faced in the forward direction of travel of a vehicle upon which the booster device was mounted, rapid acceleration of the vehicle, as in a start made from a standstill or a substantial increase in forward speed would cause the cylinder 11 to move forwardly or toward the right relative to the piston 27, due to the inertia of the piston, thereby in effect producing leftwards movement of the piston in the cylinder 11. This would produce compression of the air trapped behind the piston 27 and transmission of the resultant compressed air to the tank 7 via the left-hand port 30, branch pipe 33, left-hand discharge valve 40, and tank intake pipe 8. At the same time outside air would be drawn into the forward or right-hand end of the cylinder 11 behind the rearwardly traveling piston, via the right-hand air intake 35, the main pipe 33, the right-hand intake valve 38, the right-hand branch pipe 32' and port 31, with the forward or right-hand pressure discharge valve 41 in closed position.

It is thus seen that varying degrees of acceleration and deceleration of a vehicle or the like upon which the device was mounted would produce varying speeds and amplitudes of motion of the piston 27 in opposite directions, which are modified by the ratio between the mass of the piston 27 and the acceleration and deceleration of the vehicle. As a result, the booster device is responsive to maintain and restore the median air pressure level in the compressed air storage tank 7 as required by light, medium and heavy, and frequent and infrequent brake applications, and thereby overcome the depleted pressure conditions in the storage tank 7 which accompany road driving conditions because of the inability of the pressure regulator of the system to respond with sufficient flexibility and speed and the inability of the compressor to adequately respond to the functioning of the regulator, to keep the storage tank pressure at the desired level.

What is claimed is:

1. In combination, a vehicle committed to recurring acceleration and decelerations in forward movement thereof, a storage tank of a compressed air-operated system mounted upon said vehicle, a main pipe terminating at its ends in air intakes open to the outside air, an air inlet pipe leading from an intermediate part of said main air pipe and connected with the storage tank, a cylinder mounted on and positioned lengthwise in the direction of movement of the vehicle, said cylinder having closed ends, a piston rod extending through said cylinder and slidably engaging said ends, a sealed piston fixed on said piston rod and working in said cylinder between the ends of the cylinder, said piston being of sufficient weight to resist following movement in the cylinder when the cylinder is moved relative to the piston as the vehicle is accelerated or decelerated, said cylinder having ports adjacent to its opposite ends, said ports being separately connected to said main pipe at longitudinal spaced points between the ends of said main pipe, normally closed suction-operated valves located in said main pipe between its open ends and said ports, and normally closed pressure discharge valves located in said main pipe between said ports and said tank air inlet pipe.

2. In a pressure booster for the compressed air storage tank of a compressed air-operated system mounted upon a vehicle committed to recurring accelerations and decelerations in forward movement thereof, a main pipe terminating at its ends in air intakes open to the outside air, an air inlet pipe leading from an intermediate part of said main air pipe and connectible with the storage tank, a cylinder adapted to be mounted on and positioned lengthwise in the direction of movement of the vehicle, said cylinder having closed ends, a piston rod extending through said cylinder and slidably engaging said ends, a sealed piston fixed on said piston rod and working in said cylinder between the ends of the cylinder, said piston being of sufficient weight to resist following movement in the cylinder when the cylinder is moved relative to the piston as the vehicle is accelerated or decelerated, said cylinder having ports adjacent to its opposite ends, said ports being separately connected to said main pipe at longitudinal spaced points between the ends of said main pipe, normally closed suction-operated valves located in said main pipe between its open ends and said ports, and normally closed pressure discharge valves located in said main pipe between said ports and said tank air inlet pipe, said cylinder having means thereon acting upon portions of said piston rod outside of said cylinder serving to limit movement of said piston in said cylinder in opposite directions to points at the approach sides of said ports whereby occlusion of the ports by the piston is precluded.

3. In a pressure booster for the compressed air storage tank of a compressed air-operated system mounted upon a vehicle committed to recurring accelerations and decelerations in forward movement thereof, a main pipe terminating at its ends in air intakes open to the outside air, an air inlet pipe leading from an intermediate part of said main air pipe and adapted to be connected with the storage tank, a cylinder adapted to be mounted on and positioned lengthwise in the direction of movement of the vehicle, said cylinder having closed ends, a piston rod extending through said cylinder and slidably extending through said ends, a weighted piston fixed on said piston rod and working in said cylinder between the ends of the cylinder, said piston being of sufficient weight to resist following movement in the cylinder when the cylinder is moved relative to the piston as the vehicle is accelerated or decelerated, said cylinder having ports adjacent to its opposite ends, said ports being separately connected to said main pipe at longitudinal spaced points between the ends of said main pipe, normally closed suction-operated valves located in said main pipe between its open ends and said ports, and normally closed pressure discharge valves located in said main pipe between said ports and said tank air inlet pipe, sleeve bearings on the cylinder ends having bores receiving the ends of said piston rod outside of said cylinder, means closing the axially outward ends of the sleeve bores and forming dash-pots at the axially outward ends of the bores into which the related ends of the piston rod are adapted to move whereby movements of the piston in the cylinder in opposite directions are decelerated and stopped with the piston at the approach sides of the ports and hammering of the piston in the cylinder is precluded.

CHARLES D. DYER.

References Cited in the file of this patent

UNITED STATES PATENTS

| Number | Name | Date |
|---|---|---|
| 393,862 | Silvester | Dec. 4, 1888 |
| 1,038,374 | Jackson | Sept. 10, 1912 |
| 1,247,835 | Holden | Nov. 27, 1917 |

FOREIGN PATENTS

| Number | Country | Date |
|---|---|---|
| 295,800 | Italy | Apr. 30, 1932 |